United States Patent
Fukuda et al.

(10) Patent No.: US 9,778,466 B2
(45) Date of Patent: Oct. 3, 2017

(54) FLEXIBLE ARM AND HEAD-MOUNTED DISPLAY

(71) Applicant: WESTUNITIS CO., LTD., Osaka (JP)

(72) Inventors: Takahito Fukuda, Osaka (JP); Tadatoshi Kinoshita, Osaka (JP)

(73) Assignee: WESTUNITIS CO., LTD., Osaka (JP)

( * ) Notice: Subject to any disclaimer, the term of this patent is extended or adjusted under 35 U.S.C. 154(b) by 79 days.

(21) Appl. No.: 14/979,948

(22) Filed: Dec. 28, 2015

(65) Prior Publication Data

US 2017/0168304 A1 Jun. 15, 2017

(30) Foreign Application Priority Data

Dec. 11, 2015 (JP) ................................. 2015-241994

(51) Int. Cl.
*G02B 27/01* (2006.01)
*G02B 7/18* (2006.01)
*G06F 3/01* (2006.01)

(52) U.S. Cl.
CPC ....... *G02B 27/0176* (2013.01); *G02B 7/1805* (2013.01); *G02B 27/0172* (2013.01); *G06F 3/011* (2013.01); *G02B 2027/0154* (2013.01)

(58) Field of Classification Search
CPC .............. G02B 27/0176; G02B 7/1805; G02B 27/0172; G02B 2027/0154; G06F 3/011
USPC ....... 359/511, 513, 514, 601, 609, 831, 896, 359/900
See application file for complete search history.

(56) References Cited

U.S. PATENT DOCUMENTS

| | | | |
|---|---|---|---|
| 2002/0149545 A1* | 10/2002 | Hanayama | G02B 27/017 345/7 |
| 2007/0058261 A1* | 3/2007 | Sugihara | G02B 6/0011 359/630 |
| 2008/0262554 A1* | 10/2008 | Hayes | A61B 17/7005 606/278 |

(Continued)

FOREIGN PATENT DOCUMENTS

| | | | | |
|---|---|---|---|---|
| GB | WO 9957363 A2 * | 11/1999 | | H04M 1/15 |
| JP | 08-056946 A | 3/1996 | | |

*Primary Examiner* — Frank Font
(74) *Attorney, Agent, or Firm* — Jason H. Vick; Sheridan Ross, PC

(57) ABSTRACT

The present invention provides a head mounted display and flexible arm that is easily bendable yet capable of maintaining a bent state thereof. The flexible arm 8 is constituted with a coil 80 and a tube 90 provided on an outer periphery thereof. The coil 80 is formed as a double-strand coil containing a wire rod, stainless used steel for coil springs with high tensile strength, (SUS304WPB) 82 having a round cross-section and a Stainless Used Steel wire rod (SUS) (SUS304) 84 having a triangular cross-section. On the outer periphery of the coil 80, the tube 90 made of silicone is provided so as to be in close contact therewith. By making an outside diameter of the coil 80 slightly larger than the inside diameter of the tube 90 (approximately 10% of the tube diameter), the tube 90 fits tightly to the outer periphery of the coil 80. The tube 90 is fitted over the coil 80 in a state stretched from a natural state thereof in a direction A in the figure. Accordingly, the flexible tube 90 attempts to move in the contraction direction, and therefore force in a direction compressing the coil 80 can be applied. Thus, the bent state of the flexible arm 8 can be maintained.

9 Claims, 12 Drawing Sheets

(56) References Cited

U.S. PATENT DOCUMENTS

| | | | |
|---|---|---|---|
| 2011/0238119 A1* | 9/2011 | Moumene | A61B 17/7028 606/264 |
| 2011/0284509 A1* | 11/2011 | Kreuter | G02B 7/1822 219/121.67 |
| 2014/0049833 A1* | 2/2014 | Totani | G02B 27/0172 359/633 |
| 2016/0290402 A1* | 10/2016 | Kinoshita | F16C 35/02 |

* cited by examiner

FLEXIBLE ARM AND HEAD-MOUNTED DISPLAY

CROSS REFERENCE TO RELATED APPLICATIONS

This application claims the benefit under 35 U.S.C. 119(a) to Japanese Patent Application No. 2015-241994 filed Dec. 11, 2015, the entire disclosure of which is incorporated herein by reference in its entirety.

FIELD OF THE INVENTION

The present invention relates to a flexible arm and a movable device provided with the flexible arm.

BACKGROUND ART

A flexible arm is used for flexibly changing the orientation of a device. For example, Japanese Patent Application Publication No. 8-56946 (JP 8-56946 A) discloses a freely bendable flexible arm (coil shaft). In this document, it is disclosed that, in this flexible arm, a clearance is provided in advance between adjacent wire rods of a coil that constitutes the flexible arm such that the adjacent wire rods contact each other in a state where the flexible arm is bent with a maximum degree expected in actual use.

DISCLOSURE OF THE INVENTION

Problem to be Solved by the Invention

In the related art as described above, bending the flexible arm is easy, but maintaining the bent state is not easy. A problem is that a position of the head-mounted display or the like is displaced from an optimum position after tiring hard work finding an optimum position and adjusting a bending of the flexible arm.

Here, if the flexible arm is formed such that it requires force to bend the flexible arm, the bent state can be maintained. However, it also causes a problem that the action of bending the flexible arm cannot be done easily.

An object of the present invention is to solve such problems as described above and to provide a flexible arm that is easily bendable yet capable of maintaining a bent state thereof.

SUMMARY OF THE INVENTION

Some of the independently applicable characteristics of the present invention are as follows:

(1) A flexible arm according to the present invention includes: a coil formed by winding a wire rod in a hollow shape; and a covering tube that is in contact with an outer periphery of the coil and stretched so as to generate contracting force in a direction of pressing the adjacent wire rods into contact, or that is formed with a smaller inside diameter than an outside diameter of the coil in a natural state thereof and stretched so as to generate contracting force in a radial direction.

Thus, the flexible arm that is easily bendable yet capable of maintaining the bent state thereof can be provided.

(2) The flexible arm according to the present invention is characterized in that the coil is formed by a wire rod having a round cross-section and a wire rod having a rectangular cross-section, and the wire rods are wound in multi-strands in a hollow coil shape such that adjacent wire rods are in contact with each other.

Accordingly, the bent state of the flexible arm can be more surely maintained.

(3) The flexible arm according to the present invention is characterized in that the covering tube is formed with a silicone tube.

Thus, the flexibility of the silicone tube can be used for maintaining the bent state of the flexible arm.

(4) The movable device according to the present invention includes: a main unit; a flexible arm having one end attached to the main unit; and a movable portion attached to the other end of the flexible arm; wherein the flexible arm includes: a coil formed by winding a wire rod in a hollow shape; and a covering tube that is in contact with an outer periphery of the coil and stretched so as to generate contracting force in a direction of pressing the adjacent wire rods into contact, or that is formed with a smaller inside diameter than an outside diameter of the coil in a natural state thereof and stretched so as to generate contracting force in a radial direction.

Accordingly, a movable device in which positional adjustment of the movable portion can be easily performed with the flexible arm can be provided.

(5) The movable device according to the present invention is characterized in that a wiring is provided between the main unit and the movable portion, and the wiring is accommodated in a hollow portion of the flexible arm.

Accordingly, the wiring can be accommodated in the hollow portion, making an appearance thereof favorable.

(6) The movable device according to the present invention is characterized in that the movable portion is provided with a head-mounted display.

Accordingly, the position of the head-mounted display which requires fine positional adjustment can be easily determined.

(7) The movable device according to the present invention is characterized in that the coil is formed by a wire rod having a round cross-section and a wire rod having a rectangular cross-section, and the wire rods are wound in multi-strands in a hollow coil shape such that adjacent wire rods are in contact with each other.

Accordingly, the bent state of the flexible arm can be further securely maintained.

(8) The movable device according to the present invention is characterized in that the covering tube is formed with a silicone tube.

Thus, the flexibility of the silicone tube can be used for maintaining the bent state of the flexible arm.

(9) A method for maintaining a bent state of a flexible arm according to the present invention is a method for maintaining the bent state when the flexible arm having a coil is bent, characterized in that urging force is caused to act in a direction of pressing adjacent wire rods of the coil into contact with each other to maintain the bent state.

Thus, a method of maintaining a bent state of the flexible arm while allowing easy bending thereof can be provided.

(10) The head-mounted display according to the present invention is a head-mounted display provided with a prism, and includes a light intercepting cover that covers parts other than a light irradiation portion of the prism.

Accordingly, visibility of the display is improved.

It would be understood that other objects, uses and effects of the inventions are obvious to those skilled in the art with reference to the drawings and description below.

DETAILED DESCRIPTION OF THE PREFERRED EMBODIMENTS

Figure 1:
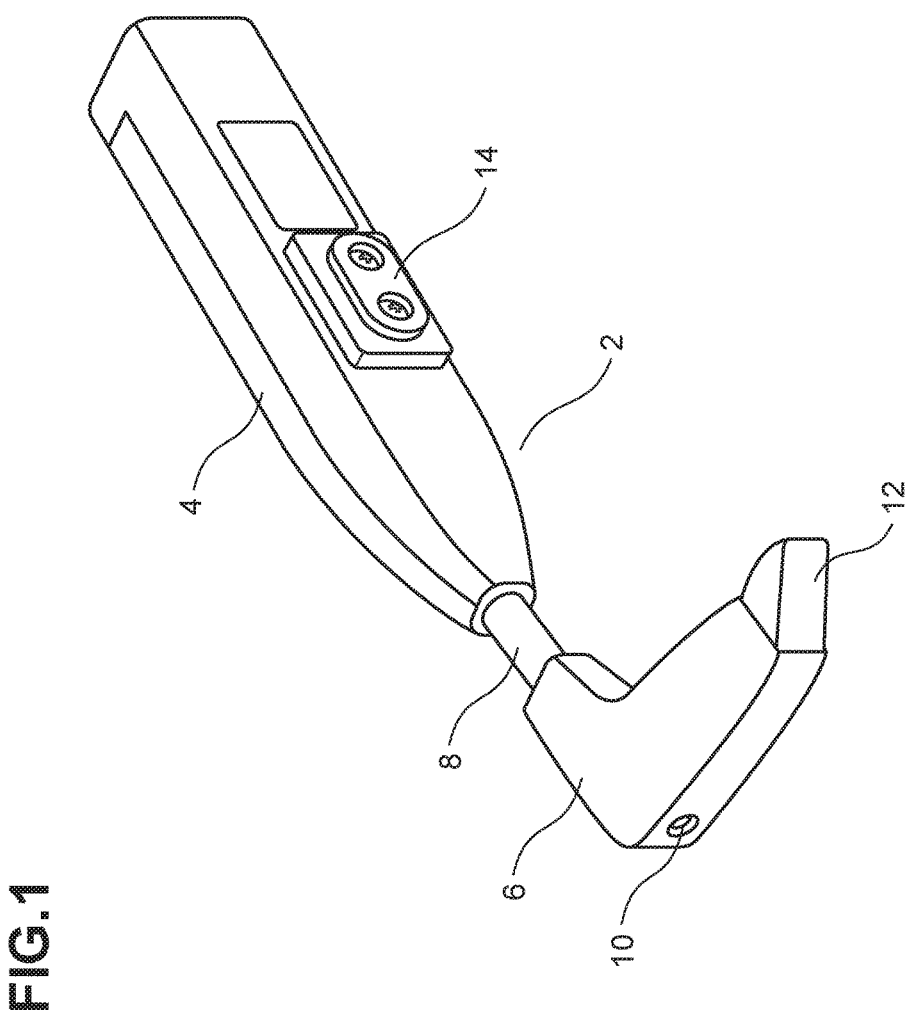
FIG. 1 is an exterior view of a wearable computer 2 that employs a flexible arm according to one embodiment of the present invention.
Figure 2:
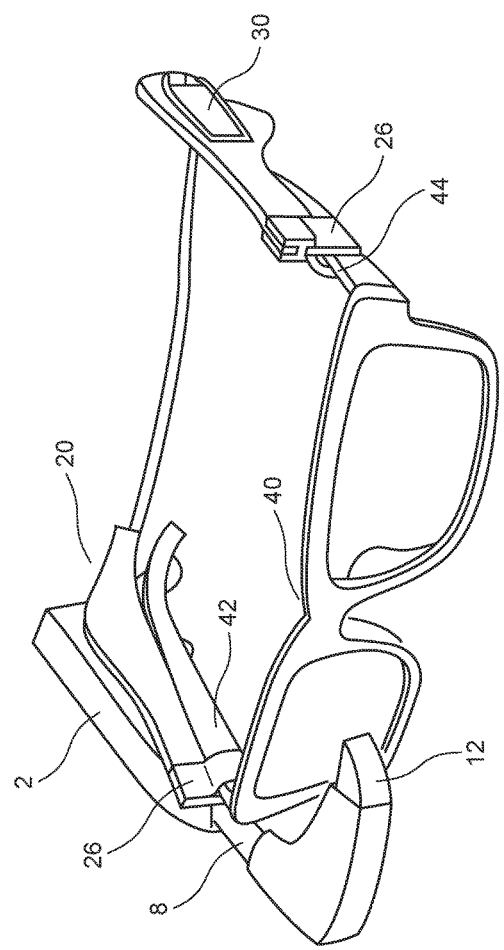
FIG. 2 is a view illustrating a state where the wearable computer 2 is attached to a pair of glasses 40 via a mounting fixture 20.

FIG. 1 shows a wearable computer 2 having a head-mounted display as a movable device according to one embodiment of the present invention. As shown in FIG. 2, the wearable computer 2 is attached to a pair of glasses 40 via a mounting fixture 20 in use.

Figure 3:
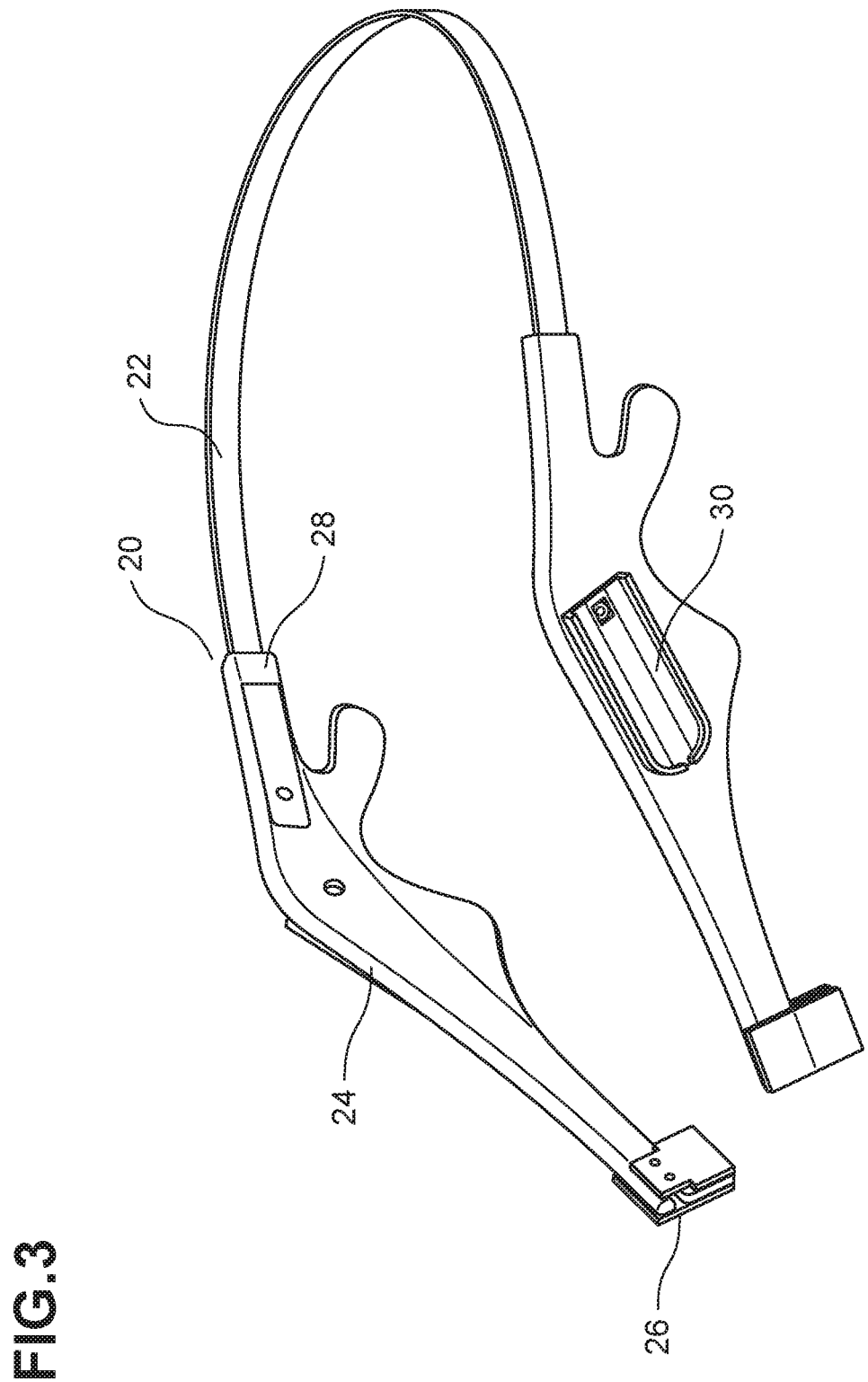
FIG. 3 is a detailed view of the mounting fixture 20.

FIG. 3 shows details of the mounting fixture 20. The mounting fixture 20 includes a U-shaped band 22 made of metal and a retaining member 24 made of synthetic resin which is attached to a tip of the U-shaped band 22. A connecting portion 28 is provided at a rear end of the retaining member 24, and the tip of the U-shaped band 22 is slidably inserted into the connecting portion 28. The mounting fixture 20 can be fit firmly to a wearer by sliding the U-shaped band 22 and making the U-shaped band 22 contact the back side of the neck of the wearer. At a tip of the retaining member 24, a sandwiching portion 26 is formed in a U-shape which is open on a lower side thereof. In addition, an attachment guide 30 is formed on a side surface of the retaining member 24.

As shown in FIG. 2, a temple 44 of the glasses 40 is sandwiched by the sandwiching portion 26 of the mounting fixture 20 from above to fix the mounting fixture 20 to the glasses 40. A guide member 14 of the wearable computer 2 is slidingly fitted to the attachment guide 30 of the mounting fixture 20 to be fixed thereon. Thus, the mounting fixture 20 is attached to the temple 44 of the glasses 40, and the wearable computer 2 is fixed to the mounting fixture 20.

A display 12 of the wearable computer 2 may be adjusted to be in an optimum position in front of an eye of the wearer by bending the flexible arm 8.

In FIG. 1, the wearable computer 2 includes a main unit 4, the flexible arm 8, and a movable portion 6. A CPU is accommodated in the main unit 4. The main unit 4 is also provided with the guide member 14 for fixing itself to the mounting fixture 20.

A camera 10 and a head-mounted display 12 provided with a liquid crystal display panel, a backlight, and a prism are accommodated in the movable portion 6.

Figure 4:
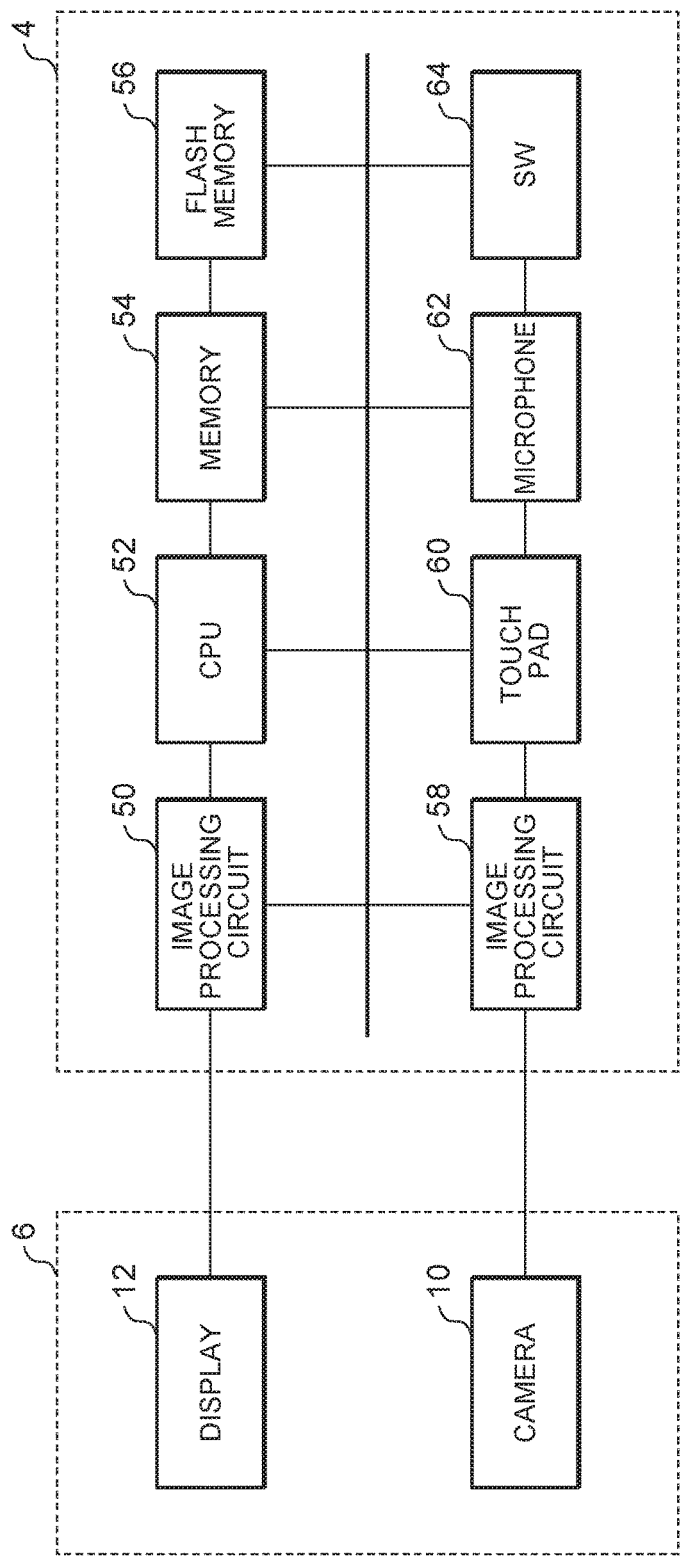
FIG. 4 is a hardware configuration diagram of the wearable computer 2.

FIG. 4 shows a circuit block diagram of the wearable computer 2. A CPU 52 is provided in the main unit 4. An image processing circuit 50, a memory 54, a flash memory 56, an image processing circuit 58, a touch pad 60, a microphone 62, and a switch 64 are connected to the CPU 52. These circuits are driven by the power supplied by a battery (not shown) accommodated in the main unit 4.

An operating system, a control program, and the like are recorded in the flash memory 56. The switch 64 is provided for turning the power on and off and for displaying a menu on the display 12. The microphone 62 is provided for acquiring ambient sound. The touch pad 60 is a capacitance touch sensor provided for detecting a position touched by a finger and moving a cursor on the display 12.

The display 12 and the camera 10 are provided at the movable portion 6. The display 12 receives and displays an image signal from the image processing circuit 50 of the main unit 4. An image captured by the camera 10 is transmitted to the image processing circuit 58 of the main unit 4, and processed by the CPU 52 of the main unit 4.

Connection from the image processing circuit 50 to the display 12, connection from the camera 10 to the image processing circuit 58, and power connection from the main unit 4 to the display 12 and the camera 10 are provided by thin coaxial cables.

Figure 5:
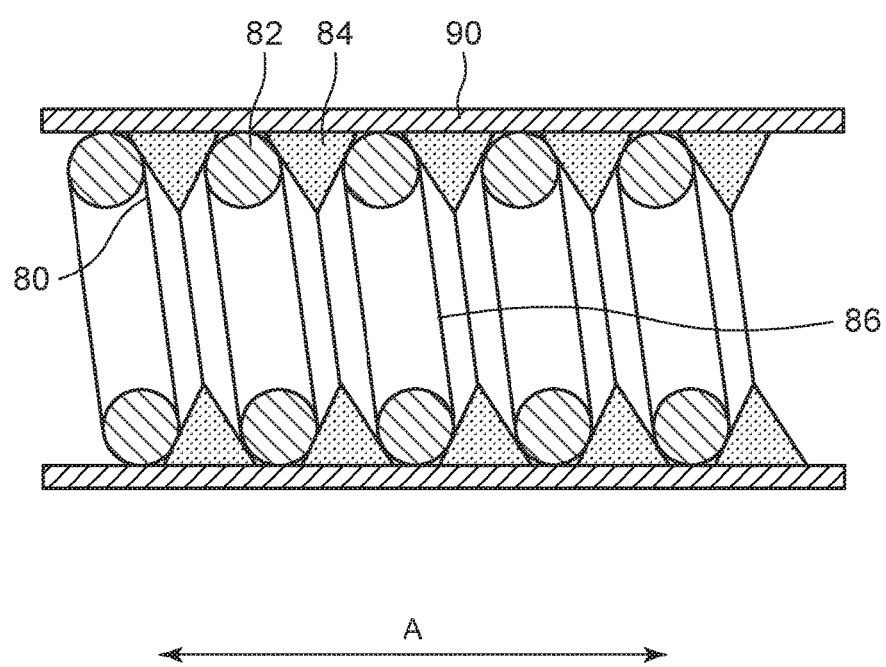
FIG. 5 is a configuration diagram of a flexible arm 8.

Referring back to FIG. 1, the orientation of the movable portion 6 relative to the main unit 4 is adjustable by bending the flexible arm 8. As shown in FIG. 5, the flexible arm 8 is constituted with a coil 80 and a tube 90 provided on an outer periphery thereof.

The coil 80 is formed as a double-strand coil containing a wire rod, stainless used steel for coil springs with high tensile strength, (SUS304WPB) 82 having a round cross-section and a Stainless Used Steel wire rod (SUS) (SUS304-S30400 in UNS) 84 having a triangular cross-section. In this embodiment, a diameter of the wire rod 82 is 0.8 mm and a length of a side of the wire rod 84 is 1.0 mm. The Stainless Used Steel wire rod (SUS) (spring material) 82 and the Stainless Used Steel wire rod (SUS) (spring material) 84 adjacent thereto are in contact with each other. The Stainless Used Steel wire rod (SUS) 84 having a triangular cross-section is arranged such that one side of the triangle is along the outer periphery thereof and a width of the Stainless Used Steel wire rod (SUS) 84 is narrower toward an inner side (or the Stainless Used Steel wire rod (SUS) 84 may be arranged the other way around). A thin coaxial cable (not shown) that connects the main unit 4 and the movable portion 6 is inserted in a hollow portion 86 of the coil 80.

On the outer periphery of the coil 80, the tube 90 made of silicone is provided so as to be in contact with the coil 80. In this embodiment, while an outside diameter of the coil 80 is 54 mm, an inside diameter of the tube 90 in a natural state is 50 mm. By making the outside diameter of the coil 80 slightly larger than the inside diameter of the tube 90 (approximately 5 to 15% of the tube diameter), the tube 90 fits tightly to the outer periphery of the coil 80.

Further, in this embodiment, the tube 90 is in close contact with the coil 80 in a state where the tube 90 is stretched from the natural state thereof in a direction A in FIG. 5. Accordingly the flexible tube 90 attempts to move in the contraction direction, and therefore a force in a direction of contracting the coil 80 can be applied to the coil 80.

Figure 6A:
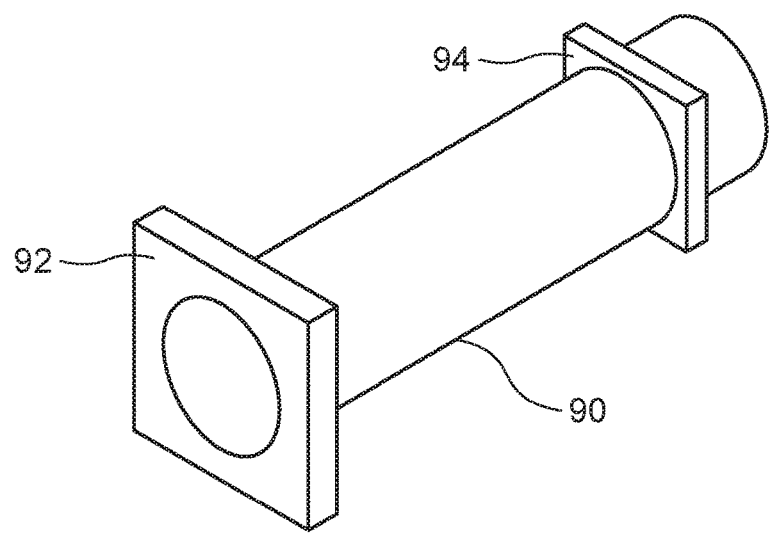
FIG. 6a is a perspective view of a tube 90.

FIG. 6a shows details of the tube 90. In this embodiment, the tube 90 is formed by molding flexible silicone. A flange 92 is provided on one end of the tube 90. A flange 94 is provided on the other end of the tube 90.

Figure 6B:
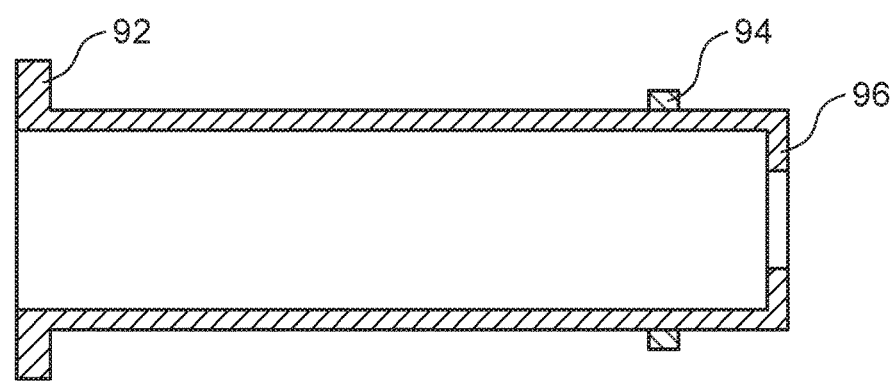
FIG. 6b is a cross-sectional view of the tube 90.

FIG. 6b shows a cross-sectional view of the tube 90. On the end of the tube 90 provided with the flange 94, a stopper portion 96 forming a small-diameter hollow portion is provided. This stopper portion 96 prevents the coil 80 from falling off.

Figure 7:
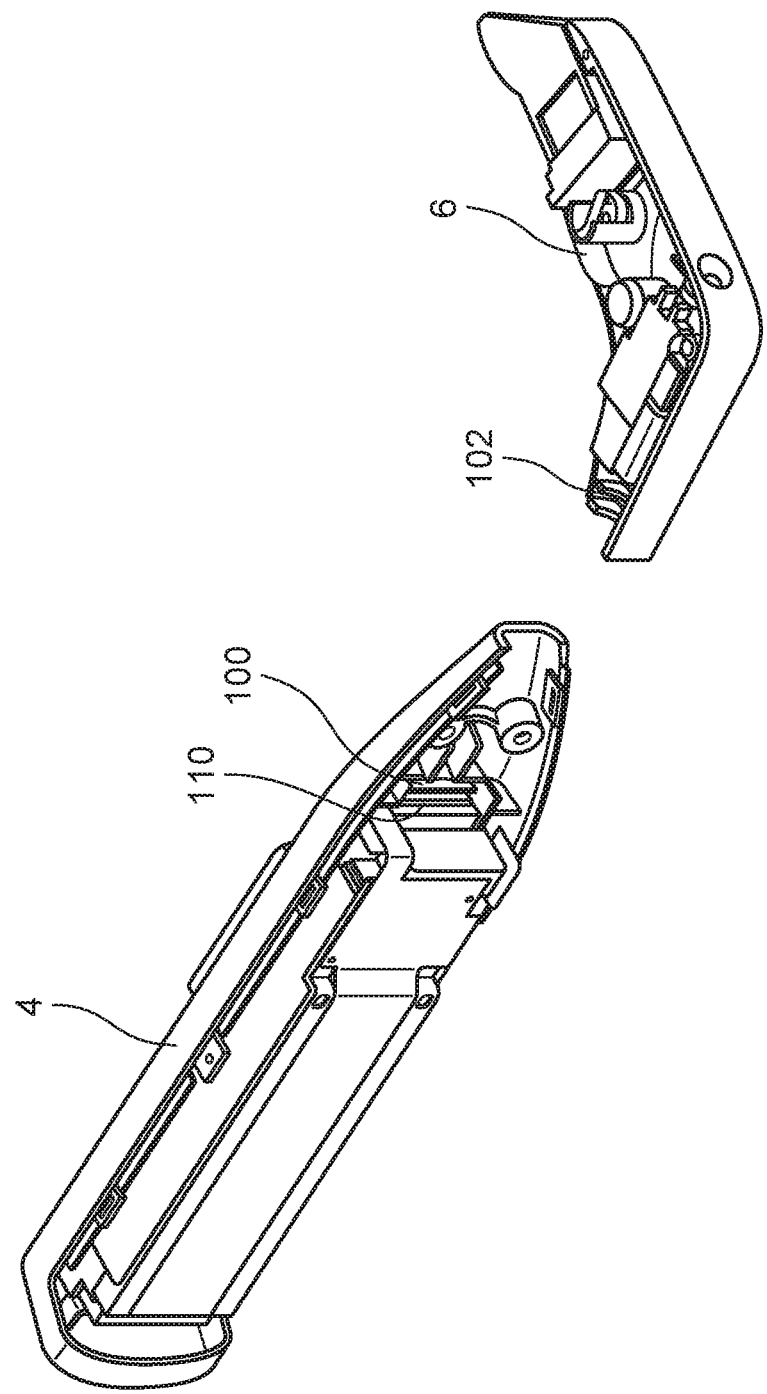
FIG. 7 is a view illustrating an internal structure of a main unit 4 and a movable portion 6.

FIG. 7 shows an internal structure of the main unit 4 and the movable portion 6 (with lids removed). A recessed portion 100 for inserting the flange 92 of the tube 90 is provided in the main unit 4. Although not shown, a similar recessed portion is also provided on the lid side. A stopper 110 is provided adjacent to the recessed portion 100. The stopper 110 is provided for retaining the coil 80, located inside the flexible arm 8, at a predetermined position when the flexible arm 8 is attached to the main unit 4.

A recessed portion 102 for inserting the flange 94 of the tube 90 is provided in the movable portion 6. Although not shown, a similar recessed portion is also provided on the lid side.

Figure 8A:
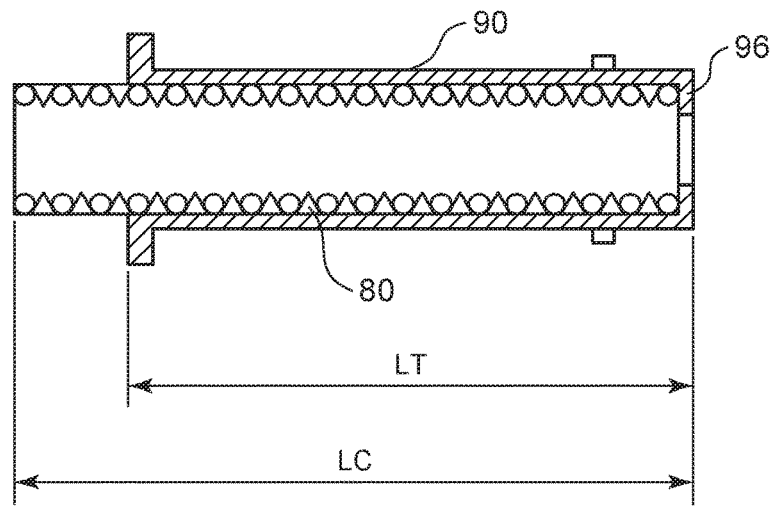
FIG. 8a is a cross-sectional view of the tube 90 fitted over a coil 80.

Procedures for attaching the flexible arm 8 to the main unit 4 and the movable portion 6 will now be described. First, as shown in FIG. 8a, the coil 80 is accommodated in the tube 90. At this time, the coil 80 is inserted until one end of the coil comes in contact with the stopper portion 96 of the tube 90.

Figure 8B:
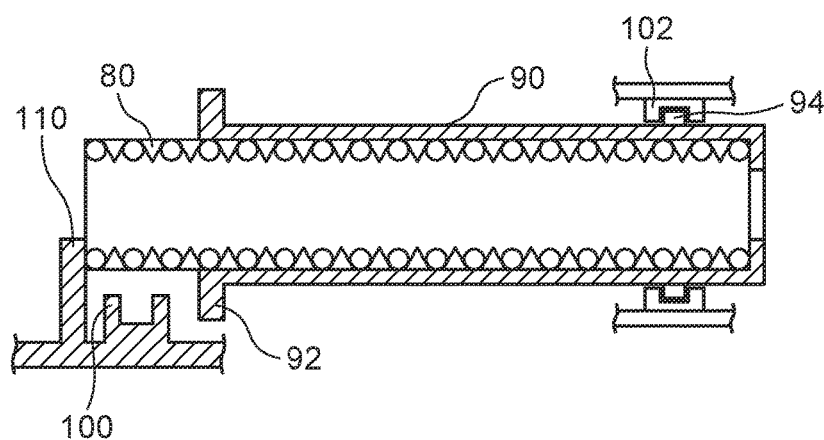
FIG. 8b is a cross-sectional view, in which the tube 90 is fitted over the coil 80 and then a flange 94 is fixed.

In this embodiment, a length LC (60 mm, for example) of the coil 80 is made longer than a length LT (50 mm, for example) of the tube 90 (approximately 10 to 50% longer than a total length of the tube 90). Thus, as shown in FIG. 8a, the coil 80 protrudes from the tube 90. As shown in FIG. 8b, if, in this state, the flange 94 of the tube 90 is fitted to the recessed portion 102 of the movable portion 6 so as to be fixed therein and the other end of the coil 80 is brought into contact with the stopper 110 of the main unit 4, the flange 92 of the tube 90 does not fit in the recessed portion 100 of the main unit 4.

Figure 8C:
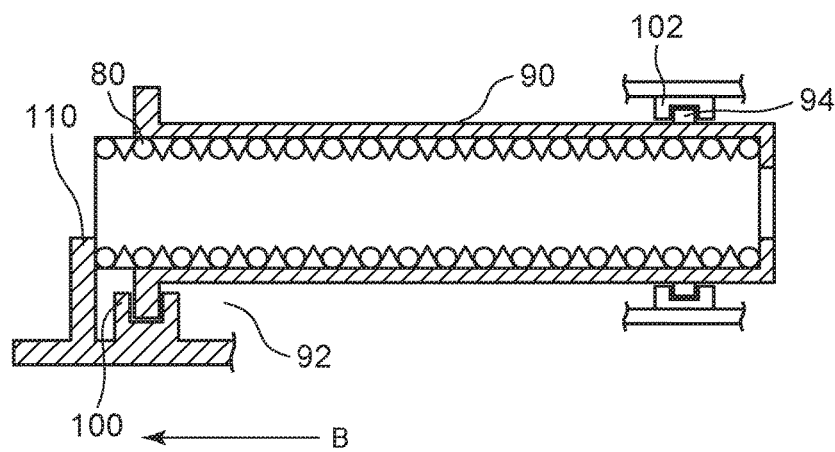
FIG. 8c is a cross-sectional view, in which the tube 90 is fitted over the coil 80 and then flanges 92, 94 are fixed.

Accordingly, as shown in FIG. 8c, the tube 90 is pulled in a direction indicated by an arrow B to fit the flange 92 of the tube 90 into the recessed portion 100 of the main unit 4. Then, the lids having the similar recessed portions therein are placed over the main unit 4.

Figure 9:
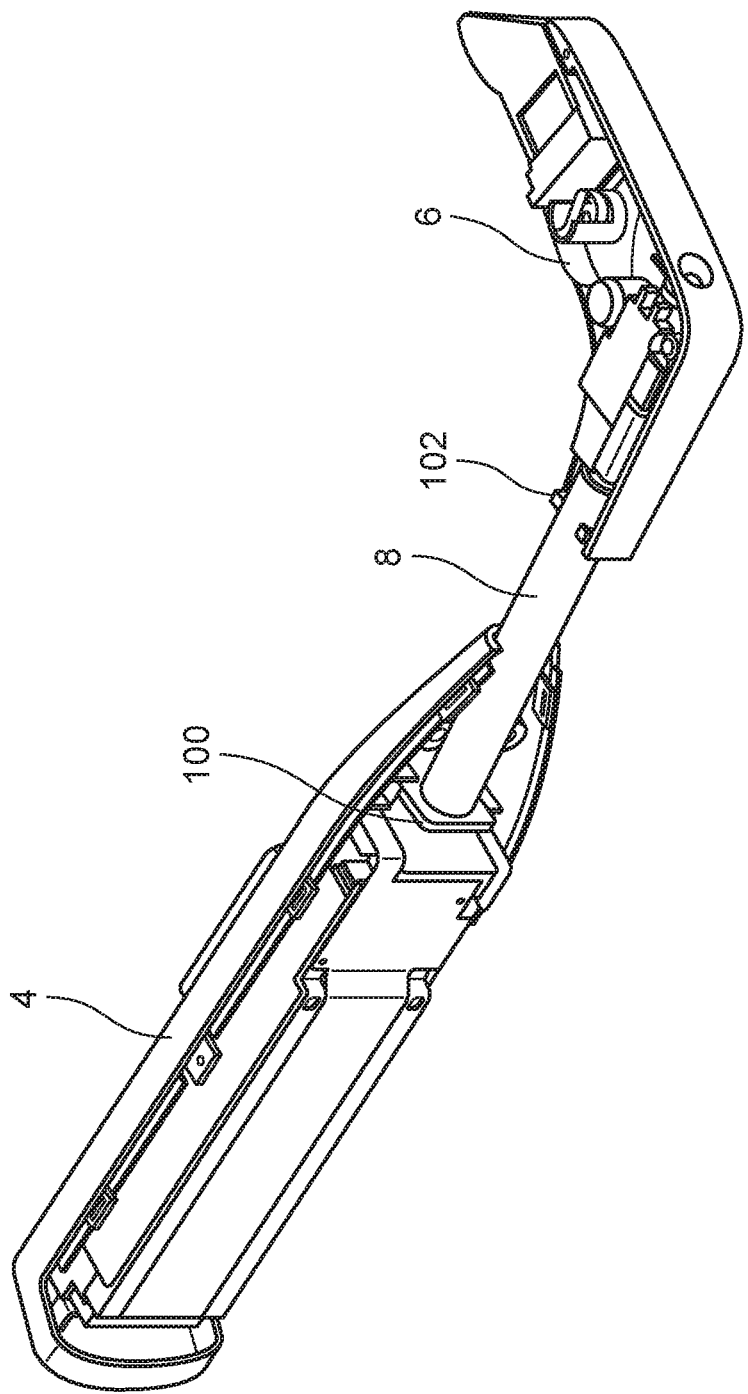
FIG. 9 is a view illustrating a state where the flexible arm 8 is attached.

FIG. 9 shows a state where the tube 90 is attached in this way. Note that the lids are omitted in FIG. 9.

Figure 10:
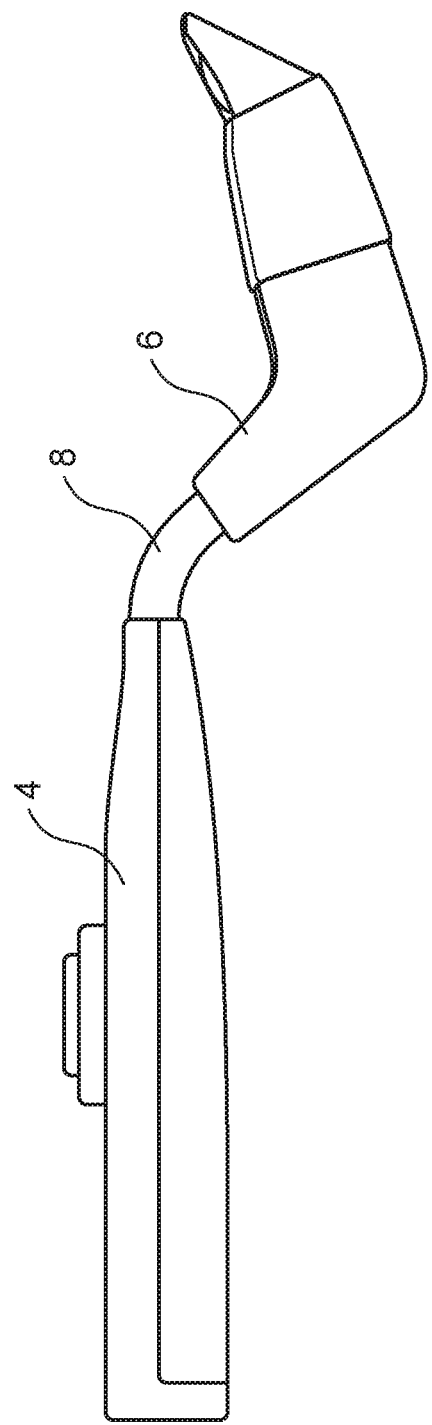
FIG. 10 is a view illustrating a state where the flexible arm 8 is bent.

In this embodiment, the coil is a double-strand coil, in which a wire rod with a round cross-section and a wire rod with a triangular cross-section are adjacent to each other. Thus, as shown in FIG. 10, a bent state of the flexible arm 8 can be maintained more securely when the flexible arm 8 is bent. This is because a returning resistance of a coil formed by the round and triangular wire rods adjacent to each other is larger than that of a coil formed by the round wire rods adjacent to each other when the coils are bent. Thus, the bent state can be better maintained. Further, because the inside diameter of the tube 90 is made smaller than the outside diameter of the coil 80 and the tube 90 is fitted over the coil 80 in the stretched state, the bent state can be maintained.

Accordingly, the present invention has an effect that an angle and a position of the flexible arm 8 can be easily adjusted and the adjusted position can be maintained. In this embodiment, advantageous function is obtained by the following two techniques; namely, by making the inside diameter of the tube 90 smaller than the outside diameter of the coil 80 (causing force to act in a radial direction), and by fitting the tube 90 over the coil 80 in the stretched state (causing force to act in a direction compressing the adjacent wire rods). These may be employed at once as described above. However, these may be employed separately. The function can be obtained by employing one of these two independently.

In the above-described embodiment, the double-strand coil is used as the coil 80, however, the coil 80 may be a single-strand coil. By the close contact and stretch of the tube 90, the single-strand coil also produces a function of maintaining the bent.

Further, instead of the double-strand coil, a multi-strand coil having three strands or more may also be used. However, in this case as well, the coil is preferably wound such that the adjacent wire rods consist of the round and triangular wire rods.

In the above-mentioned embodiment, the coil 80 is formed with the round and triangular wire rods. However, the coil 80 may also be formed with a round wire rod and a polygonal wire rod having four or more sides. Instead, horn-shaped wire (such as trapezoids and parallelograms) that are not regular polygonal shapes may also be used.

In the above-mentioned embodiment, the tube 90 applies force in the direction of compressing the coil 80. However, urging means (a flexible member, a spring material, or the like), which is urged in a contracting direction of the coil 80 and fixed at both ends of the coil 80, may be provided instead.

Figure 11:
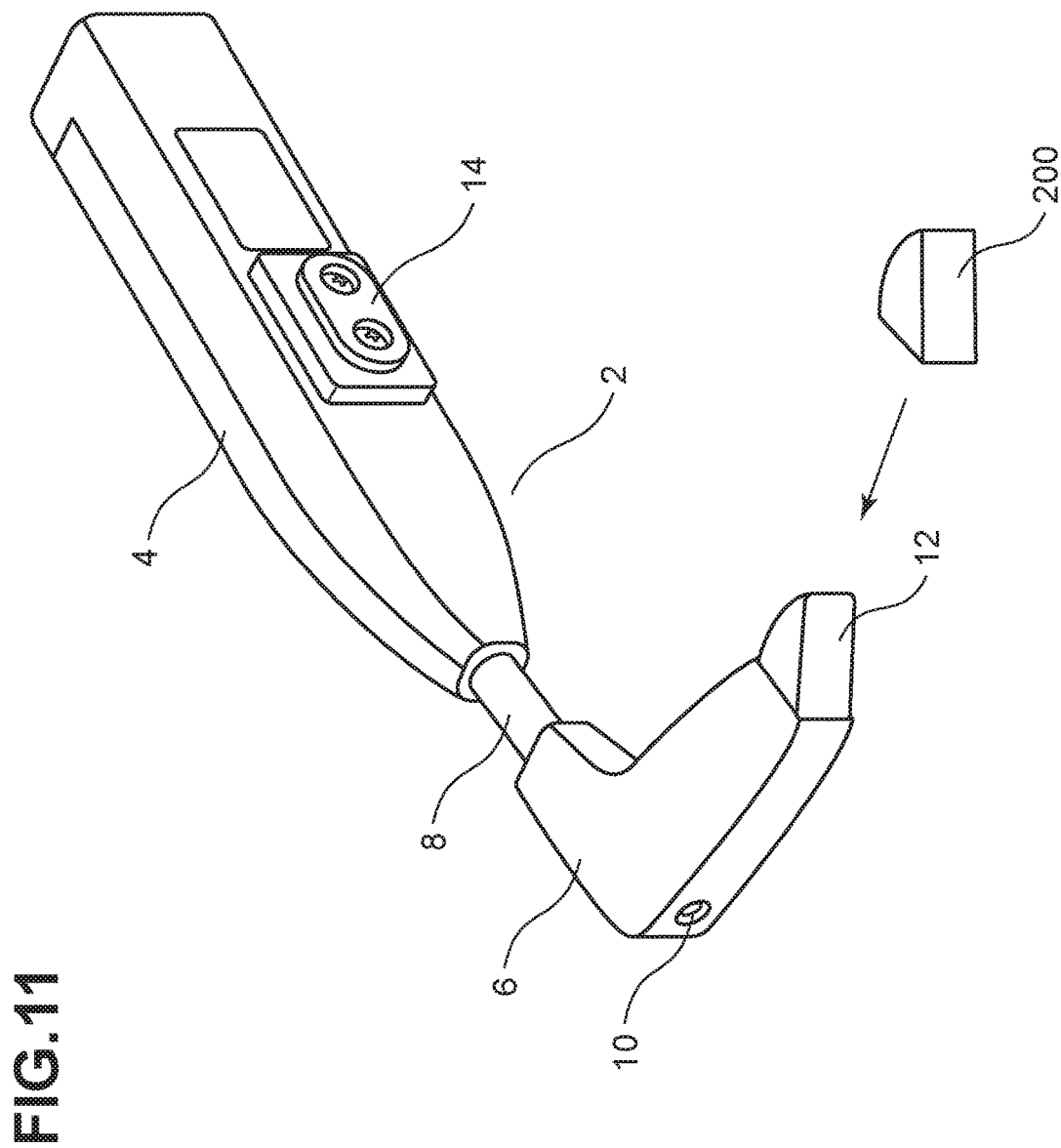
FIG. 11 is a view illustrating the wearable computer 2 according to another embodiment.

As shown in FIG. 1, in the above-mentioned embodiment, the prism of the display 12 is exposed. Therefore, sometimes the displayed image is not clear due to effect of external light. Accordingly, as shown in FIG. 11, a cover 200 may be placed over the prism. Thus, effects of the external light can be eliminated and the displayed image can therefore be made clear.

Figure 12A:
FIGS. 12a, 12b, 12c, 12d are detailed views of a cover 200.
Figure 12B:
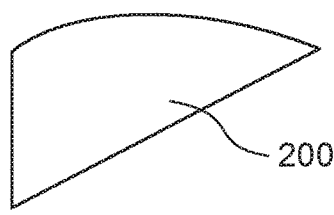
Figure 12C:
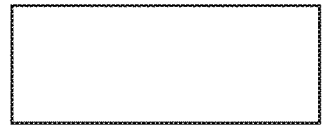
Figure 12D:
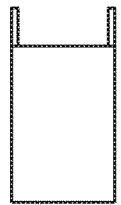

FIGS. 12a to 12d show details of the cover 200. FIG. 12b shows a plan view. As illustrated in the rear view of FIG. 12a, a side opposing the eye of the user is open. In addition, a left end (the side of the movable portion 6) shown in FIG. 12a is open for wearing. FIG. 12c is a front view and FIG. 12d is a side view.

While light is intercepted by the cover 200 in the above description, paint for intercepting light may be applied to a surface of the prism.

In the above-mentioned embodiment, a case where the flexible arm 8 is applied to the wearable computer was described. However, the flexible arm 8 may be applied to, for example, medical equipment, home electrical appliances, and industrial equipment at portions that require positional adjustment by bending. More particularly, the flexible arm 8 is highly effective when used with devices such as cameras, displays, and sensors that require positional adjustment.

What is claimed is:
1. A flexible arm comprising:
a coil formed by winding a wire rod in a hollow shape; and
a stretched covering tube that is in contact with an outer periphery of the coil maintaining a contracting force in a direction of pressing the adjacent wire rods into contact, or that is formed with a smaller inside diameter than an outside diameter of the coil in a natural state thereof and maintaining a force in a radial direction on the coil.

2. The flexible arm according to claim 1, wherein the coil is formed by a wire rod having a round cross-section and a wire rod having a rectangular cross-section, and the wire rods are wound in multi-strands in a hollow coil shape such that the adjacent wire rods are in contact with each other.

3. The flexible arm according to claim 1, wherein the covering tube is formed with a silicone tube.

4. A movable device comprising:
a main unit;
a flexible arm having one end attached to the main unit; and
a movable portion attached to the other end of the flexible arm; wherein the flexible arm comprises:
a coil formed by winding a wire rod in a hollow shape; and
a stretched covering tube that is in contact with an outer periphery of the coil maintaining a contracting force in a direction of pressing the adjacent wire rods into contact, or that is formed with a smaller inside diameter than an outside diameter of the coil in a natural state thereof and maintaining a contracting force in a radial direction on the coil.

5. The movable device according to claim 4, wherein
a wiring is provided between the main unit and the movable portion; and
the wiring is accommodated in a hollow portion of the flexible arm.

6. The movable device according to claim 4, wherein the movable portion is provided with a head-mounted display.

7. The movable device according to claim 4, wherein the coil is formed by a wire rod having a round cross-section and a wire rod having a rectangular cross-section, and the wire rods are wound in multi-strands in a hollow coil shape such that the adjacent wire rods are in contact with each other.

8. The movable device according to claim 4, wherein the covering tube is formed with a silicone tube.

9. A method for maintaining a bent state of a flexible arm having a coil when the flexible arm is bent comprising,
maintaining the bent state of the flexible arm by causing an urging force to act in a direction of pressing adjacent wire rods of the coil into contact.

* * * * *